United States Patent
Helmstetter et al.

(10) Patent No.: US 6,478,690 B2
(45) Date of Patent: *Nov. 12, 2002

(54) MULTIPLE MATERIAL GOLF CLUB HEAD WITH A POLYMER INSERT FACE

(75) Inventors: Richard C. Helmstetter, Rancho Santa Fe, CA (US); Ronald K. Hettinger, Oceanside, CA (US); J. Neil Hall, Carlsbad, CA (US); Augustin W. Rollison, San Diego, CA (US); Kamal Sarkar, San Diego, CA (US); Joshua G. Breier, San Marcos, CA (US); John G. Guard, Oceanside, CA (US); Pijush K. Dewanjee, Oceanside, CA (US)

(73) Assignee: Callaway Golf Company, Carlsbad, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 09/683,291

(22) Filed: Dec. 10, 2001

(65) Prior Publication Data

US 2002/0065144 A1 May 30, 2002

Related U.S. Application Data

(63) Continuation of application No. 09/679,034, filed on Oct. 4, 2000, now Pat. No. 6,328,661.

(51) Int. Cl.[7] ............................................. A63B 53/04

(52) U.S. Cl. ...................... 473/324; 473/332; 473/340; 473/342; 473/349

(58) Field of Search ................................. 473/324, 329, 473/332, 334, 335, 337, 340, 341, 345, 342, 347, 348, 349, 350, 290, 291, 313, 131; 273/DIG. 8, 167 R, 167 F, 169, 173, 171, 172, 167 H, 167 J, 77 R, 194 B (56) References Cited

U.S. PATENT DOCUMENTS

| | | | |
|---|---|---|---|
| 3,937,474 A | | 2/1976 | Jepson et al. |
| 4,811,950 A | * | 3/1989 | Kobayashi |
| 5,458,332 A | | 10/1995 | Fisher |
| 5,485,997 A | | 1/1996 | Schmidt et al. |
| 5,524,331 A | | 6/1996 | Pond |
| 5,575,472 A | | 11/1996 | Magerman et al. |
| 5,743,813 A | | 4/1998 | Chen et al. |
| 5,921,871 A | | 7/1999 | Fisher |
| 5,931,743 A | | 8/1999 | Baker et al. |
| 6,095,931 A | | 8/2000 | Hettinger et al. |
| 6,372,831 B1 | | 8/2001 | Dewanjee |
| 6,328,661 B1 | * | 12/2001 | Helmstetter |

FOREIGN PATENT DOCUMENTS

EP     0891790     1/1999

* cited by examiner

Primary Examiner—Sebastiano Passaniti
(74) Attorney, Agent, or Firm—Michael A. Catania (57) ABSTRACT

The present invention is a golf club (30) having a club head main body (34) with a recess (38), an polymer insert (40) in the recess (38), an isolation layer (52) and a weight body (50). The polymer insert (40) is composed of a thermosetting polyurethane material having a Shore D hardness in the range of 42 to 55, and a Bayshore rebound in the range of 51 to 60. The preferred thermosetting polyurethane material is formed from a p-phenylene diisocyanate prepolymer and a curing agent. The golf club (30) is preferably a putter, however, it may be a wood or an iron. The particular thermosetting polyurethane provides a soft striking face for feel and a good rebound for distance. The weight body (50) is preferably composed of a tungsten alloy, and the isolation layer (52) is preferably composed of a thermoplastic polyurethane.

1 Claim, 6 Drawing Sheets

MULTIPLE MATERIAL GOLF CLUB HEAD WITH A POLYMER INSERT FACE

CROSS REFERENCE TO RELATED APPLICATIONS

The present application is a continuation application of U.S. patent application Ser. No. 09/679,034, filed on Oct. 4, 2000, now U.S. Pat No. 6,328,661.

BACKGROUND OF INVENTION

1. Field of the Invention

The present invention relates to a golf club head with a polymer insert. More specifically, the present invention relates to a golf putter head with a polymer insert.

2. Description of the Related Art

Throughout the history of golf, which dates back to as early as 1457, various techniques have been used to enhance the hitting characteristics of golf club heads. Golf club heads having inserts for the striking portion have been used at least as far back as 1880's when leather face irons were manufactured in Scotland. Golfer's in the 1890's were able to purchase putters with faces composed of gutta percha. More recently, inserts composed of various materials and shapes have been put forth by the creative geniuses of the golf industry to provide golfers with better feel and control of the golf ball.

One example is an ODYSSEY® putter having a STRONOMIC® insert that is disclosed in Magerman et al., U.S. Pat. No. 5,575,472 for a Golf Putter Head Having Face Insert And Method Of Forming The Same. The Magerman et al. Patent discloses a putter head with a recess into which is poured or inserted a resinous material which cures and is subsequently milled to produce the putter.

Another example is Pond, U.S. Pat. No. 5,524,331 for a Method For Manufacturing Golf Club Head With Integral Inserts that discloses a method for casting a graphite-epoxy composite insert within a recess of a face of a metal club head. The golf club head of the Pond Patent is directed at displacing the weight away from the center and increasing the moment of inertia.

Another example is Schmidt et al., U.S. Pat. No. 5,485,997, for a Golf Putter Head With Face Plate Insert Having Heightened Medial Portion, that discloses a putter head with a face plate composed of a non-metallic material such as an elastomer. The overall construction of the putter head of the Schmidt et al. Patent is directed at enlarging the sweet spot and improving the peripheral weighting.

Yet another example is found in Baker et al., U.S. Pat. No. 5,931,743 for a Putter Having Club Head With A Golf-Ball Engagement Insert And A Shaft Rearwardly Of The Insert which discloses a putter with a center shaft and an insert composed of a thermoplastic polyurethane. Another example is Jepson et al., U.S. Pat. No. 3,937,474 for a Golf Club With Polyurethane Insert, which discloses a wood having an insert on its striking face that is composed of a polyurethane formed from a toluene diisocyanate polyether terminated prepolymer and a curing agent. The hardness of this insert varies from 40 to 75 shore D, and a Bayshore Resiliometer of 1 7 or above. The polyurethane insert is claimed to impart additional energy to the golf ball during a golf hit.

Chen et al., U.S. Pat. No. 5,743,813 for a Golf Club Head discloses a wood composed of stainless steel with a three layer face having a first stainless steel layer, an elastic layer and a second stainless steel layer. The three-layer face does not absorb the hitting force when a golf ball is hit.

Fisher, U.S. Pat. No. 5,458,332, for a Golf Putter Head With A Cushioning Face, discloses a set of golf putters, each having an insert composed of polyurethane with a hardness in the range of 70 Shore A to about 80 Shore D. The rebound factor of each of the inserts is in the range of 12.5% to 50%, and the inserts are formulated to effect a reproducible direct linear relationship between the rebound factor and the distance of the putt.

Yet another example is McGeeney et al, European Patent Application Number 0891790 for a Multiple Density Golf Club Head And Method Of Manufacturing which discloses a putter with a central segment composed of a thermoplastic elastomer or a thermoset polymer. Possible thermoplastic elastomers include styrene co-polymers, co-polyesters, polyurethanes, polyamides, olefins and vulcanates. Possible thermoset polymers include epoxides, polyimides and polyester resins. The central segment has a minimum durometer hardness of Shore D 50. The central segment is bounded by metallic heel and to portions. However, the use of inserts is restrained in order to maintain the integrity of the game of golf.

In this regard, the Rules of Golf, established and interpreted by the United States Golf Association (USGA) and The Royal and Ancient Golf Club of Saint Andrews, sets forth certain requirements for a golf club head. The requirements for a golf club head are found in Rule 4 and appendix 11. A complete description of the Rules of Golf are available on the USGA web page at www.usga.org. Although the Rules of Golf do not expressly state specific parameters for an insert for a putter, the Rules of Golf have been interpreted to establish that an insert for a putter should have a Shore A hardness greater than 87±2%, have a constant thickness, have a thickness of at least 0.125 inches, and not act like a spring.

The prior art is absent a golf club head that has an insert composed of a material that is soft, but above the USGA requirements, and has a sufficient Bayshore rebound to provide a golf ball with the necessary distance to reach the hole.

SUMMARY OF INVENTION

The present invention provides a golf club head with an insert that is composed of a soft material yet has a good Bayshore rebound and a low tan. The present invention is able to accomplish this by using a material composed of a polyurethane formed from the reaction of at least one diisocyanate prepolymer and a curing agent.

One aspect of the present invention is a golf club head including a main body with a front face and a recess therein, an insert, an isolation layer and a weight body. The insert is disposed within the recess and is composed of a thermoset polyurethane having a shore D hardness in the range of 42 to 55, and a Bayshore rebound in the range of 50 to 70.

The thermoset polyurethane may be formed from a p-phenylene diisocyanate (PPDI)-based polyurethane prepolymer and a curing agent. Alternatively, the thermoset polyurethane may be formed from a toluene diisocyanate (TDI) based polyurethane prepolymer and a curing agent. Further, the thermoset polyurethane may be formed from a TDI-based polyurethane prepolymer, a PPDI-based polyurethane prepolymer, and a curing agent. The PPDI-based polyurethane insert has a lower tan δ value. The tan δ value measures the amount of energy a material loses as heat upon a high distortion or impact event (i.e. hysteresis).

Another aspect of the present invention is a golf club head including a club head main body having a recess therein, an insert disposed within the recess, an isolation layer composed of a thermoplastic polyurethane and weight body composed of tungsten. The insert is composed of a thermoset polyurethane formed from a PPDI-terminated polyester prepolymer in an amount up to 90 parts, a PPDI-terminated polyether prepolymer in an amount up to 90 parts, 10 to 40 parts of a TDI polyurethane prepolymer, and at least one curing agent. The curing agent is selected from the group consisting of a diol, a mixture of diols, a triol, a mixture of triols, a hydroquinone, a mixture of hydroquinones, a diamine, a mixture of diamines, an oligomeric diamine, and any mixture thereof.

Yet another aspect of the present invention is a golf club head that includes a main club head body with a front face and a recess therein, an insert, an isolation layer and a weight body. The club head main body is composed of a carbon steel and includes a front face, a toe wall to one side of the front face and a heel wall to the other side of the front face, and a sole. The front face has a recess therein for the insert. The insert is composed of a polymer material that has a shore D hardness in the range of 42 to 55, and a Bayshore rebound in the range of 50 to 70.

Having briefly described the present invention, the above and further objects, features and advantages thereof will be recognized by those skilled in the pertinent art from the following detailed description of the invention when taken in conjunction with the accompanying drawings.

DETAILED DESCRIPTION

As shown in FIGS. 1–8, a golf club of the present invention is generally designated 30. The golf club 30 is preferably a putter, however the golf club 30 may alternatively be an iron or an utility wood. The golf club 30 includes a club head 32 having a body 34 with a front face 36 with a recess 38 therein. The club head 32 of the present invention also includes a polymer insert 40 disposed within the recess 38. The polymer insert 40 extends along most of the face 36 from a heel end 42 of the club head 32 to a toe end 44 of the club head 32, and from a sole 46 of the club head 32 to a crown 48 of the club head 32. The club head 32 also has a weight body 50 and an isolation layer 52 disposed between the weight body 50 and the main body 34. The club head 32 also has a hosel 54 for connection to a shaft 56.

Figure 1:
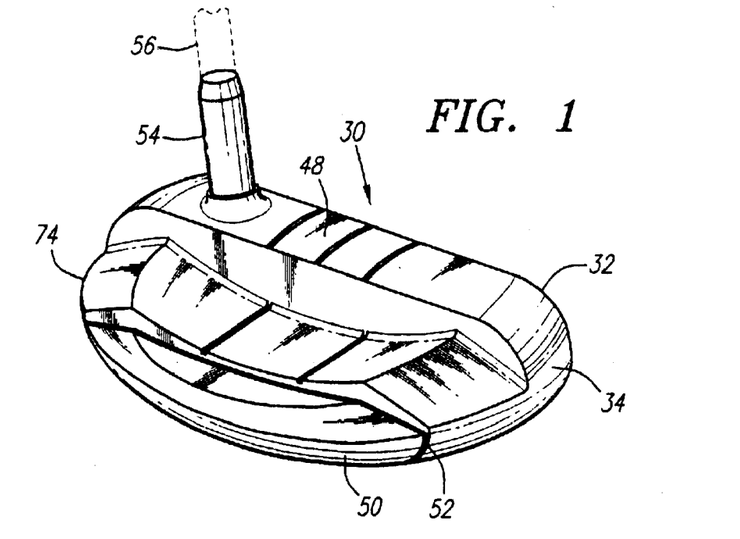
FIG. 1 is a perspective view of a preferred embodiment of the golf club head of the present invention.
Figure 2:
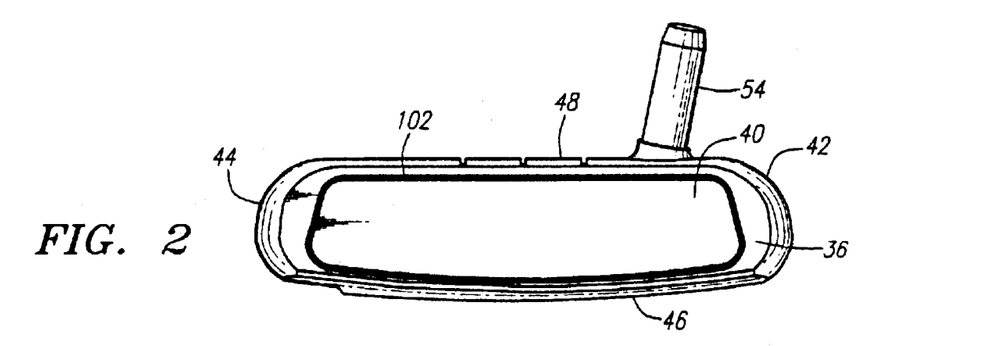
FIG. 2 is a front view of the golf club head of FIG. 1.
Figure 3:
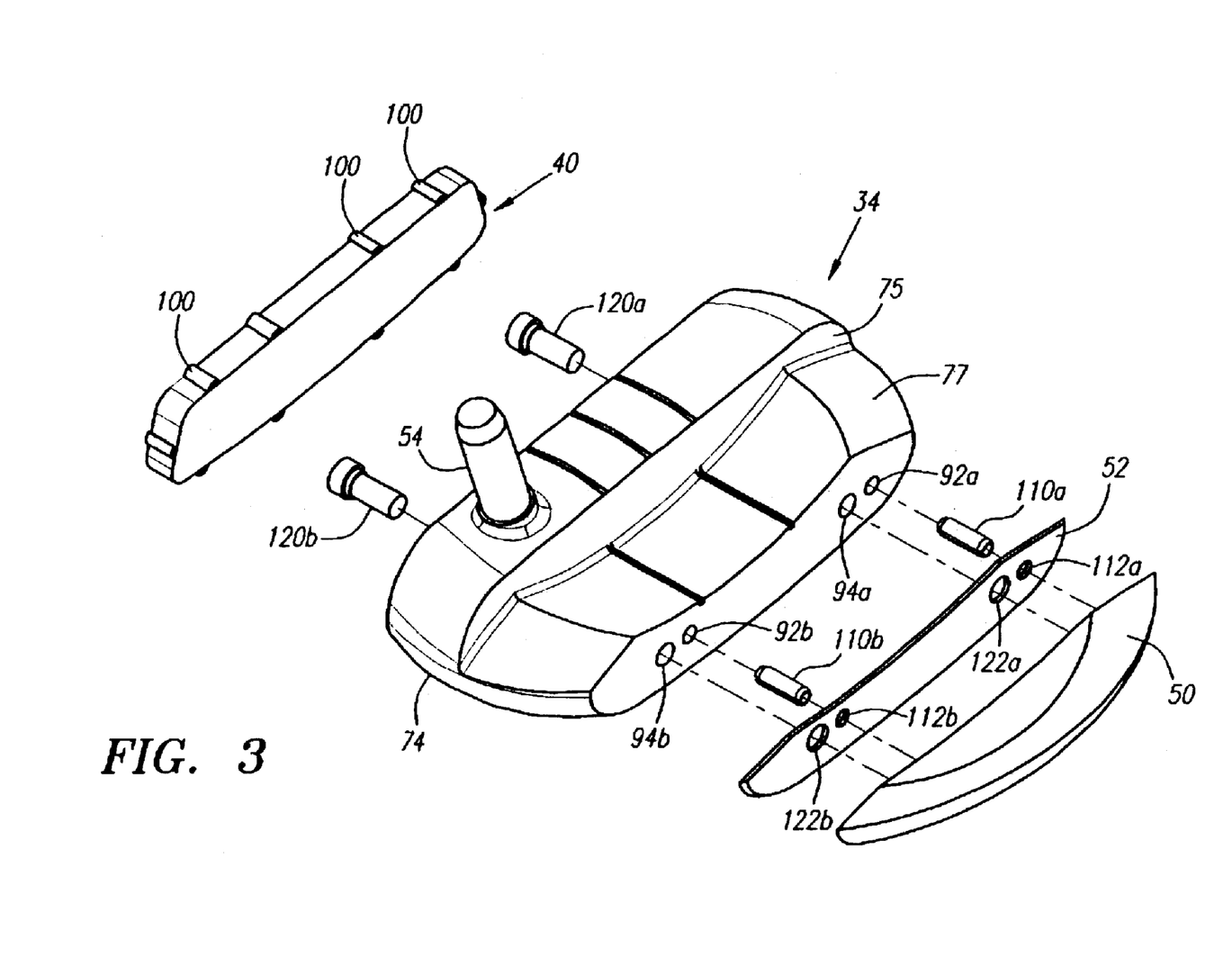
FIG. 3 is an exploded view of the golf club head of FIG. 1.
Figure 4:
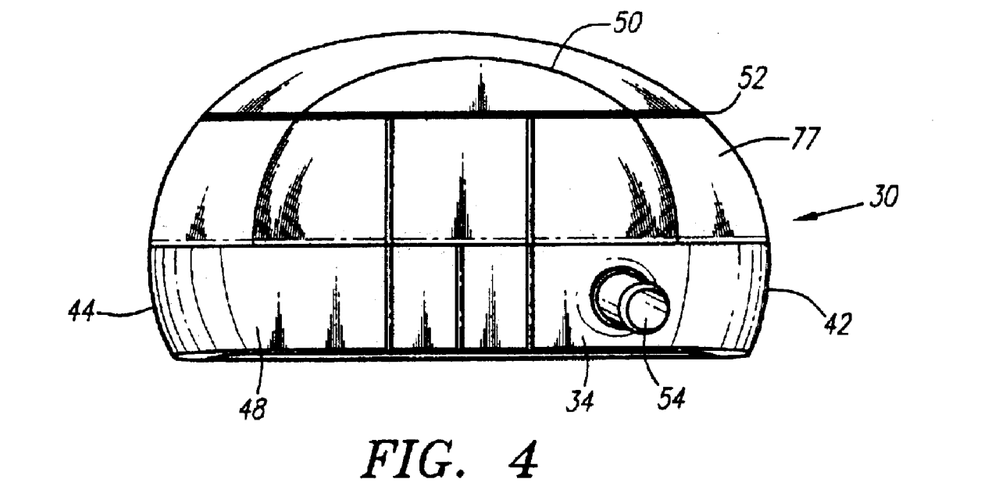
FIG. 4 is a top plan view of the golf club head of FIG. 1.
Figure 5:
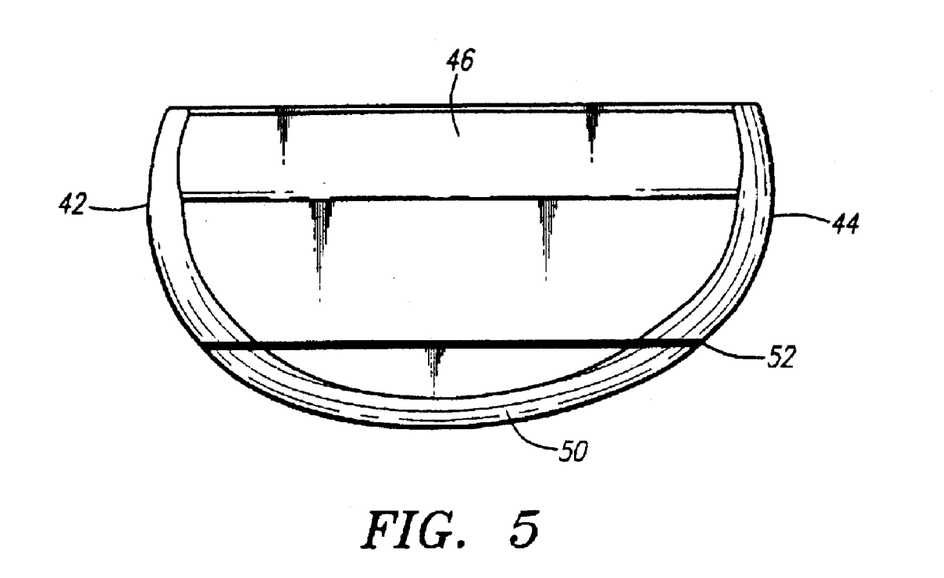
FIG. 5 is a bottom plan view of the golf club head of FIG. 1.
Figure 6:
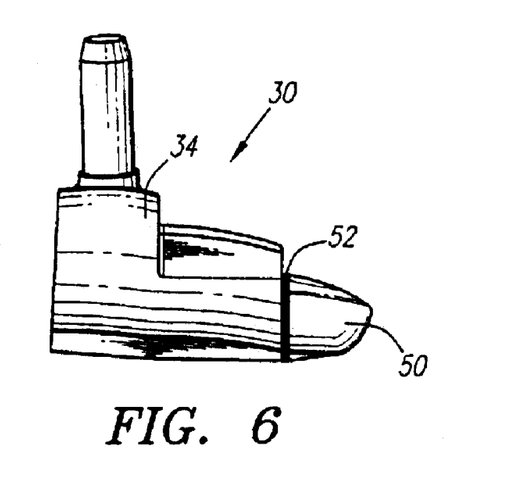
FIG. 6 is a heel end view of the golf club head of FIG. 1.
Figure 7:
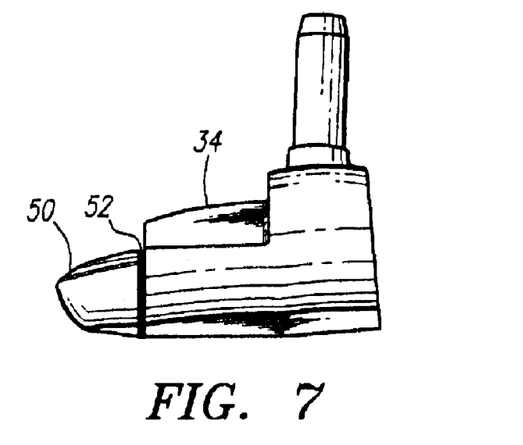
FIG. 7 is a toe end view of the golf club head of FIG. 1.
Figure 8:
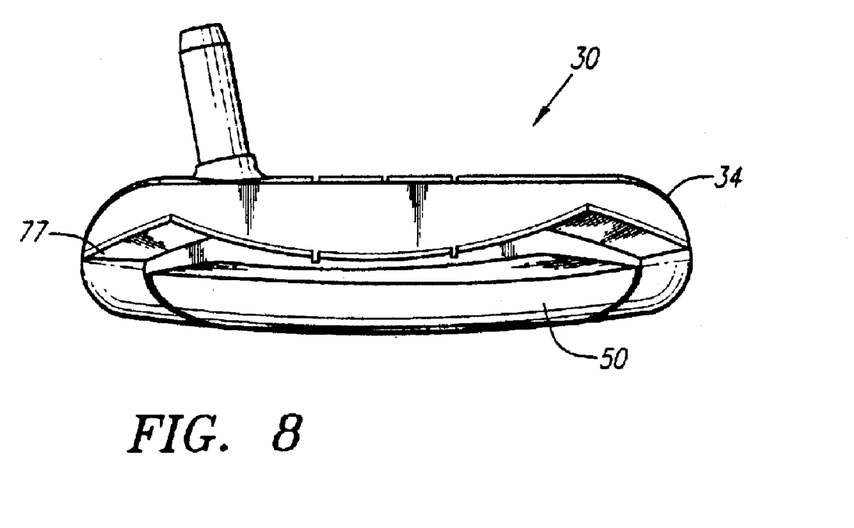
FIG. 8 is a rear view of the golf club head of FIG. 1.
Figure 9:
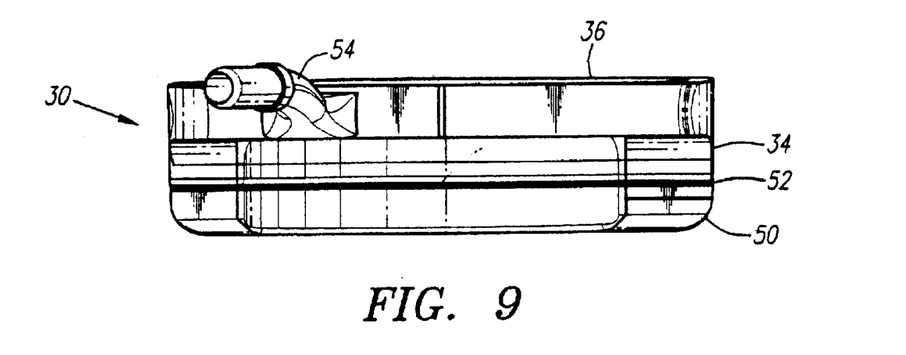
FIG. 9 is a top plan view of an alternative embodiment of the golf club head of the present invention.
Figure 10:
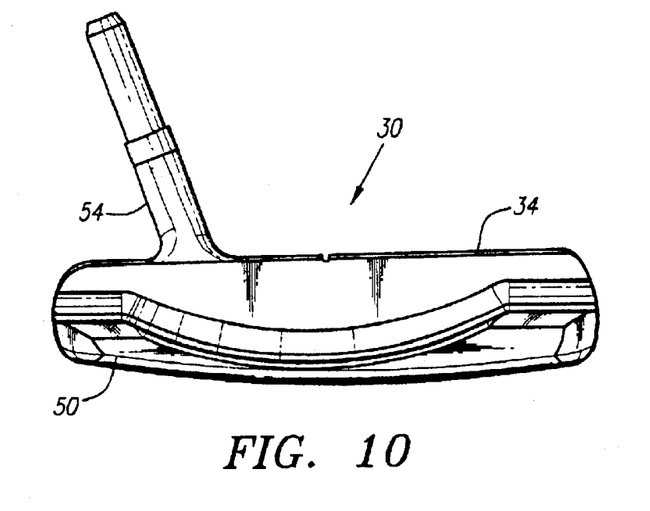
FIG. 10 is a rear view of the golf club head of FIG. 9.
Figure 11:
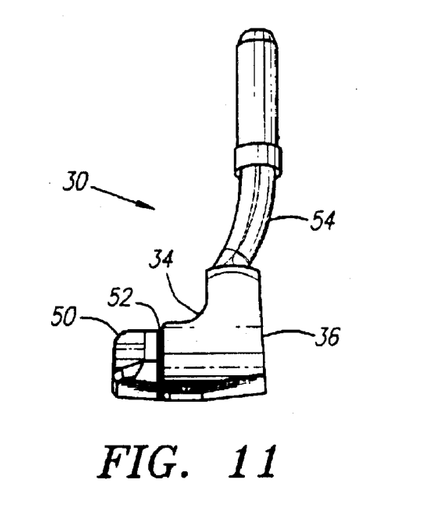
FIG. 11 is a toe end view of the golf club head of FIG. 9.
Figure 12:
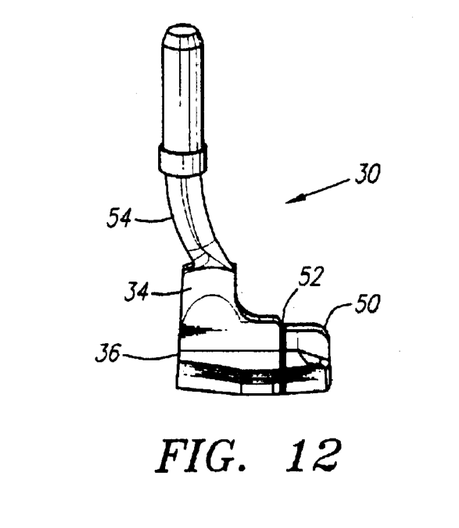
FIG. 12 is a heel end view of the golf club head of FIG. 9.
Figure 13:
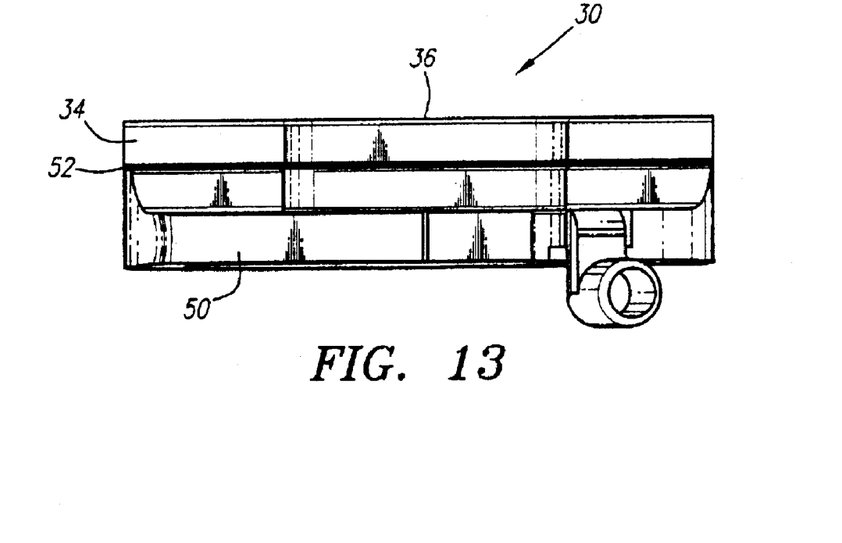
FIG. 13 is a top plan view of an alternative embodiment of the golf club head of the present invention.
Figure 14:
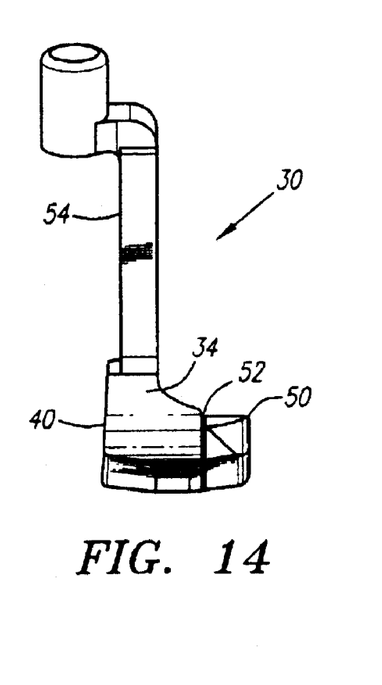
FIG. 14 is a heel end view of the golf club head of FIG. 13.
Figure 15:
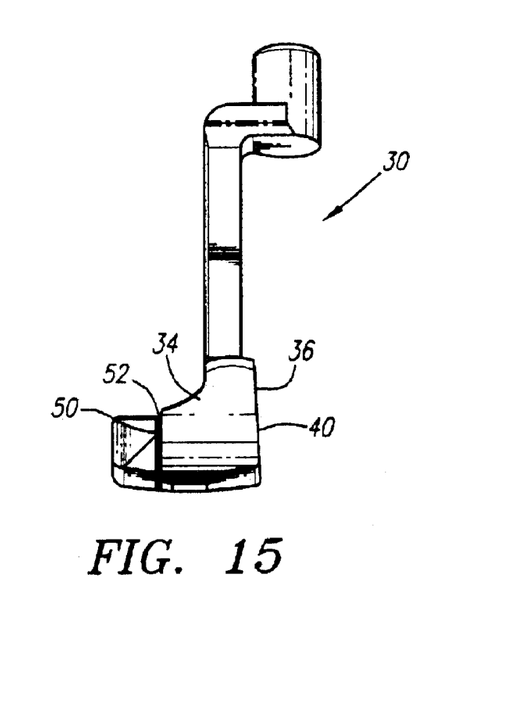
FIG. 15 is a toe end view of the golf club head of FIG. 13.

The main body 34 of the club head 32 is preferably composed of a metallic material such as titanium, titanium alloy, carbon steel or stainless steel. However, those skilled in the pertinent art will recognize that the main body 34 may be composed of other materials without departing from the scope and spirit of the present invention. Further, the non-insert portion of the face 36 may be smooth or textured to provide a consistent or non-consistent surface with the exterior surface of the insert. Additionally, the body 34 may be specifically weighted to provide a specific center of gravity for the golf club 30. The main body 34 ranges from 200 grams to 250 grams.

The weight body 50 is preferably composed of a tungsten alloy material, however, those skilled in the pertinent art will recognize that the weight body may be composed of any high density material. The preferred tungsten alloy material is 90% tungsten, 7% nickel and 3% iron. The density of the weight body 50 ranges from 10 grams per cubic centimeter (g/cc) to 20 g/cc, and is most preferably 17 g/cc. The weight body preferably weighs from 50 grams to 125 grams.

The isolation layer 52 is preferably composed of a thermoplastic material, most preferably a thermoplastic polyurethane. The thickness of the isolation layer 52 varies from 0.020 inch to 0.100 inch, and is most preferably 0.035 inch. The function of the isolation layer 52 is to minimize the combination of the impact vibration frequency patterns of the main body 34 and the weight body 50. A more detailed explanation of the isolation layer 52 and the weight body 50 is provided in U.S. Pat. No. 6,095,931, which is assigned to the assignee of this patent, Callaway Golf Company, and which is hereby incorporated by reference in its entirety.

FIGS. 9–15 illustrate two other embodiments of the present invention. Each of the putters 30 of FIGS. 9–15 has a main body 34, a polymer insert 40 disposed within a recess 38 of the body 34, an isolation layer 52 and a weight body 50. A putter 30 of the present invention may be a flanged blade, a mallet or a semi-mallet putter, however, those skilled in the art will recognize that other similar putter designs may be utilized without departing from the scope and spirit of the present invention.

Figure 2A:
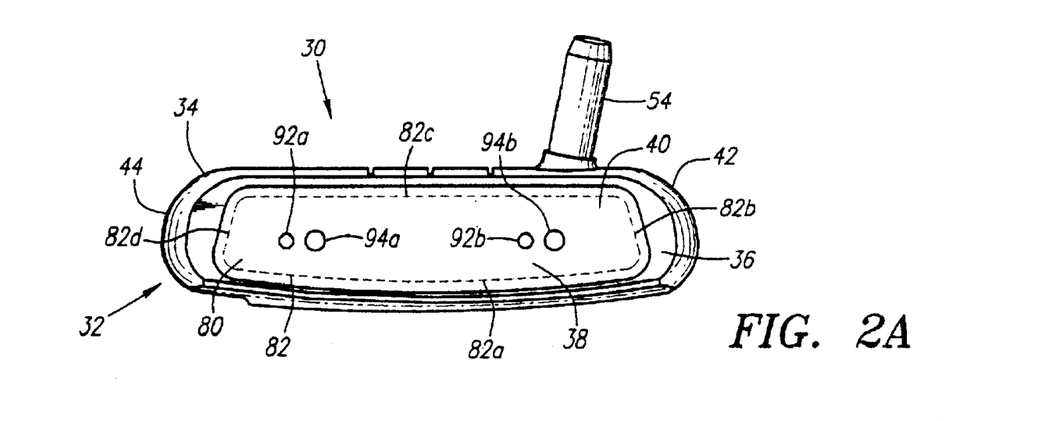
FIG. 2A is a front view of the golf club head of FIG. 1 with the insert removed to illustrate the recess wall.

Referring specifically to FIG. 2A, the recess 38 of the body 54 is defined by a recess face wall 80 which is substantially parallel with the polymer insert 60, and a recess edge wall 82 which is substantially perpendicular to the recess face wall 80. The recess face wall 80 defines the depth of the recess 38, which will determine the thickness of the polymer insert 40. The recess edge wall 82, as shown in FIG. 2A, is composed of a bottom recess edge wall 82a, a heel recess edge wall 82b, a top recess edge wall 82c and a toe recess edge wall 82d. The recess edge wall 82 defines the shape of the recess 38, and the length of the recess edge wall 82 is determined by the depth of the recess 38. The recess wall 80 has a first main body alignment hole 92a and a second main body alignment hole 92b for alignment of the isolation layer 52 and weighting body 50 as described below. The recess wall 80 also has a first main body screw hole 94a and a second main body screw hole 94b for attachment of the isolation layer 52 and weighting body 50 as described below. In a preferred embodiment, the polymer insert 40 will engage the recess edge wall 82 as described below.

The putter 30 of FIGS. 1–8 is a mallet style putter. The rear 74 of the club head 32 has a rear wall 75 and a flanged portion 77. The polymer insert 40 occupies more than 80% of the area of the face 36 of the club head 32. The polymer insert 40 of the present invention may vary in shape and thickness depending on the design of the putter 30. A preferred shape of the polymer insert 40 is a trapezoidal shape with curved corners.

As shown in FIGS. 2 and 2A, the polymer insert 40 is held within the recess 38 by integral tabs 100 on the perimeter of the polymer insert 40, an adhesive epoxy 102 applied into the spacings between the tabs 100, and an adhesive epoxy 104, not shown, applied to the recess frontal wall 80 and/or the rear surface of the polymer insert 40. A more detailed description of this attachment means is set forth in U.S. Pat. No. 6,238,302, assigned to the assignee herewith (Callaway Golf Company), and entitled A Golf Club With A Polymer Insert Having Tabs, which is hereby incorporated by reference in its entirety.

The isolation layer 52 and the weight body 50 are attached to the main body 34 by a plurality of screws that are threaded through holes in the recess wall 80. The golf club head 32 is preferably assembled by first positioning the isolation layer 52 between the weight body 50 and the main body 34. A first alignment pin 110a is inserted through the first main body alignment hole 92a in the recess wall 80, a first isolation layer alignment hole 112a and a first weight body alignment hole 114a, not shown. A second alignment pin 110b is inserted through the second main body alignment hole 92b in the recess wall 80, a second isolation layer alignment hole 112b and a second weight body alignment hole 114b, not shown. The placement of the alignment pins 110a–b ensures that the peripheral edges of the main body 34, the isolation layer 52 and the weight body 50 are properly alignment before permanent attachment of the isolation layer 52 and weight body 50 to the main body 34. To secure the components together, a first screw 120a is threaded through and into the first main body screw hole 94a in the recess wall 80, a first isolation layer screw hole 122a and a first weight body screw hole 124a, not shown. A second screw 120b is threaded through and into the second main body screw hole 94b in the recess wall 80, a second isolation layer screw hole 122b and a second weight body screw hole 124b, not shown. The screws permanently fix the isolation layer 52 and the weight body 50 to the main body 34 since the affixation of the insert 40 in the recess 38 prevent access to the screws 120a–b.

The main aspect of the present invention is the polymer insert 40 which is composed of a polymer material having a predetermined hardness and a predetermined Bayshore rebound as further described below. Preferably, the polymer insert 40 is composed of a polyurethane material formed from a PPDI prepolymer and a curing agent. An alternative embodiment has the polymer insert composed of a polyurethane formed from a blend of diisocyanate prepolymers. The blend of diisocyanate prepolymers preferably includes at least one TDI-based polyurethane prepolymer and at least one other diisocyanate-based polyurethane prepolymer. In a preferred embodiment, the blend of diisocyanate prepolymers includes at least one PPDI-based polyurethane prepolymer and at least one TDI-based polyurethane prepolymer. Alternative embodiments have a blend which includes at least two different PPDI-based polyurethane prepolymers and at least one TDI-based polyurethane prepolymer. Yet further embodiments may include at least one TDI-based polyurethane prepolymer and at least one MDI-based polyurethane prepolymer. Those skilled in the pertinent art will recognize that multiple variations of diisocyanate prepolymers may be utilized without departing from the scope and spirit of the present invention.

The polyurethane utilized in the preferred embodiment of the present invention is composed of only a PPDI terminated polyether prepolymer and a diol blend curing agent. A preferred PPDI terminated polyether prepolymer is available from Uniroyal Chemical Company of Middlebury, Conn. under the tradename ADIPRENE® LFPX 950. Another alternative embodiment is composed of a blend of a TDI-based prepolymer, a second diisocyanate-based polyurethane prepolymer and a curing agent. The TDI-based prepolymer is preferably formed from TDI and a polyether polyol having a molecular weight between 250 and 5000. The second diisocyanate-based polyurethane prepolymer is preferably a PPDI-based prepolymer formed from PPDI and a polyester polyol, preferably a polycaprolactone. The prepolymer blend is cured with a curing agent. The curing agent, or curative, may be a diol (e.g., 1,4 butane diol, trimethylpropanol), a mixture of diols (e.g., 1,4 butane diol and ethylene glycol, or other suitable glycols), a hydroquinone, a mixture of hydroquinones, a triol, a mixture of triols, a diamine, a mixture of diamines, an oligomeric diamine, a triamine, or a blend of some or all of these materials. Preferably, the curing agent is a blend of a diamine and a mixture of diols.

In an alternative embodiment, the blend of prepolymers includes three diisocyanate-based polyurethane prepolymers. In this embodiment, the TDI-based prepolymer is preferably formed from TDI and a polyether polyol. The second diisocyanate-based polyurethane prepolymer is preferably a PPDI-based prepolymer formed from PPDI and a polyester polyol, preferably a polycaprolactone. The third diisocyanate-based polyurethane prepolymer is a PPDI-based prepolymer formed from PPDI and a polyether polyol. Preferably, the curing agent is a blend of a diamine and a mixture of diols. As mentioned above, alternative embodiments may have variations of the dual blend or the tri-blend, and may use a TDI-based polyurethane prepolymer with other non-PPDI-based polyurethane prepolymers.

The TDI-based prepolymer may range from 10 to 40 percent of the polyurethane prepolymer blend. Preferably, the TDI-based prepolymer is 30 percent of the polyurethane prepolymer blend. A preferred TDI based prepolymer is a TDI terminated polyether prepolymer available from Uniroyal Chemical, under the tradename ADIPRENE® LF950.

The dual blend and tri-blend formulations will preferably contain a PPDI terminated polyester prepolymer and/or a PPDI terminated polyether prepolymer. A preferred PPDI terminated polyester prepolymer is available from Uniroyal Chemical under the tradename ADIPRENE® LFPX 2950. A preferred PPDI terminated polyether prepolymer is available from Uniroyal Chemical under the tradename ADIPRENE® LFPX 950.

The polyurethane prepolymer blend may have 10 to 40 parts of a TDI terminated polyether prepolymer blended with 60 to 90 parts of a PPDI terminated polyether prepolymer. Alternatively, the polyurethane prepolymer blend may have 10 to 40 parts of a TDI terminated polyether prepolymer blended with 60 to 90 parts of a PPDI terminated polyester prepolymer. Further, the polyurethane prepolymer blend may have 10 to 40 parts of a TDI terminated polyether prepolymer blended with 5 to 90 parts of a PPDI terminated polyether prepolymer and 5 to 90 parts of a PPDI terminated polyester prepolymer. More specific blend formulations are set forth in the Examples below.

The polymer insert 40 of the present invention is most preferably composed of a polyurethane formed from a PPDI-terminated polyether polyurethane prepolymer, and cured with a blend of 1,4 butane diol and glycols. A suitable blend of diol and glycols is available from Uniroyal Chemical under the tradename VIBRACURE®A250. A diamine curing agent may also be utilized. A suitable diamine is toluene ethylene diamine available from Albemarle Corporation of Baton Rouge, La. under the tradename ETHACURE® 100. Other agents which may be utilized during the curing process include dimethylthio-2,4-toluenediamine (such as EHTACURE® 300 available from Albemarle Corporation); trimethyl glycol di-p-aminobenzoate (such as VERSALINK® 740M available from Air Products and Chemicals, Inc., Allentown, Pa.); cyclohexane dimethanol; hydroquinone-bis-hydroxyethyl ether; phenyldiethanol amine mixture (such as VIBRACURE® A931 available from Uniroyal Chemical); methylene dianiline sodium chloride complex (such as CAYTOR® 31 available from Uniroyal Chemical); and/or prionene amine. This list of preferred agents (including chain extenders, cross-linkers and curing agents) is not meant to be exhaustive, as any suitable (preferably polyfunctional) chain extender, cross-linker, or curing agent may be used.

The curing agent mixture for the polymer insert 40 of the present invention may have numerous variations. In a preferred embodiment, the curing agent is composed only of a diol blend such as VIBRACURE® 250. Alternatively, a diamine component may be utilized such as a blend of different diamines such as a blend of EHTACURE® 100 with ETHACURE® 300.

The ratio of the polyurethane prepolymer blend to curing agent is determined by the nitrogen-carbon-oxygen group (NCO) content of the polyurethane prepolymer blend. For example, the NCO content of the PPDI-terminated polyether is preferably in the range of 5.0% to 8.0%. The NCO content of the TDI-terminated polyether or TDI-terminated polyester is preferably in the range of 4.0% to 9.0%. The NCO content of the PPDI-terminated polyester is preferably in the range of 2.0% to 6.0%. The NCO content of the polyurethane prepolymer blend ranges from 2% to 8% of the polyurethane prepolymer blend. The amount of curing agent should correspond to 90% to 110% of the mol equivalence of the NCO content of the polyurethane prepolymer blend. The weight ratio of the polyurethane prepolymer blend to the curing agent is preferably in the range of about 10:1 to about 30:1.

Prior to curing, the polyurethane prepolymer blend and curing agent are preferably stored separately. The polyurethane is formed by first heating and mixing the polyurethane prepolymer blend with the curing agent in a mold, and then curing the mixture by applying heat and pressure for a predetermined time period to form a sheet of material with a predetermined thickness. The thickness of the polymer insert 40 may vary depending on its application. A preferred thickness for a putter 30 is in the range of 0.125 to 0.500 inches. A preferred thickness is 0.250 inches. The thickness of the polymer insert 40 is increased or decreased to influence the feel to the golfer during impact with a golf ball, and the distance the golf ball will travel after impact. The absence of a catalyst (e.g. dibutyl tin dilaurate, a tertiary amine, etc.) allows for better control of the process in forming a sheet with a uniform thickness. Furthermore, additives such as colorants may also be added to the mixture.

The polyurethane prepolymer blend material is preferably degassed and warmed in a first holding container prior to processing of the mold sheet. The processing temperature for the polyurethane prepolymer blend is preferably in the range of about 100–220° F., and most preferably in the range of about 120–200° F. The polyurethane prepolymer blend is preferably flowable from the first holding container to a mixing chamber in a range of about 200–1100 grams of material per minute, or as needed for processing. In addition, the polyurethane prepolymer blend material may be agitated in the first holding container, in the range of 0–250 rpm, to maintain a more even distribution of material and to eliminate crystallization.

The curing agent is preferably degassed and warmed in a second holding container prior to processing. The processing temperature for the curative is preferably in the range of about 50–230° F., and most preferably in the range of about 80–200° F. The curing agent is preferably flowable from the second holding container to the mixing chamber in the range of about 15–75 grams of material per minute, or as needed.

The polyurethane prepolymer blend and curative mixture are preferably added to the common mixing chamber at a temperature in the range of about 160–220° F. A colorant material, such as, for example, titanium dioxide, barium sulfate, and/or zinc oxide in a glycol or castor oil carrier, and/or other additive material(s) well known in the art, may be added to the common mixing chamber. The amount of colorant material added is preferably in the range of about 0–10% by weight of the combined polyurethane prepolymer blend and curative materials, and more preferably in the range of about 2–8%. Other additives, such as, for example, polymer fillers, metallic fillers, and/or organic and inorganic fillers (e.g. polymers, balata, ionomers, etc.) may be added as well to increase the specific gravity of the polyurethane cover 16 of the present invention. It was discovered that the addition of barytes (barium sulfate) or a blend of barytes and titanium dioxide (preferably added in a carrier glycol and/or castor oil) to the mixture, in the amounts of about 0.01–30%, may add sufficient weight to the polymer insert 60. The entire mixture may be agitated in the mixing chamber in the range of about 1 to 250 rpm prior to molding.

The mixture is poured into a vertical mold for curing into a sheet having a predetermined thickness. The sheet is then cut into inserts as described in U.S. Pat. No. 6,238,302, previously incorporated by reference.

TABLE FIVE

| Insert Ex. No. | Polyurethane prepolymer | | | | | Bayshore Rebound | Shore D Hardness |
|---|---|---|---|---|---|---|---|
| | TDI | PPDI-1 | PPDI-2 | PPDI-3 | PPDI-4 | | |
| 1 | | | | 100 | | 57 | 45 |
| 2 | 30 | | 20 | 50 | | 52 | 52 |
| 3 | 30 | | | | 70 | 55 | 47 |
| 4 | 30 | | | | 70 | 55 | 47 |

TABLE FIVE-continued

| Insert Ex. No. | Polyurethane prepolymer | | | | | Bayshore Rebound | Shore D Hardness |
|---|---|---|---|---|---|---|---|
| | TDI | PPDI-1 | PPDI-2 | PPDI-3 | PPDI-4 | | |
| 5 | 30 | 50 | 20 | | | 52 | 47 |
| 6 | 30 | | | | 70 | 55 | 47 |
| 7 | 30 | 50 | 20 | | | 52 | 47 |
| 8 | 30 | | 20 | 50 | | 52 | 53 |
| <u>9</u> | <u>30</u> | <u>70</u> | | | | <u>55</u> | <u>53</u> |
| 10 | 20 | 80 | | | | 55 | 47 |
| 11 | 30 | 70 | | | | 55 | 47 |
| 12 | 30 | 70 | | | | 55 | 47 |

Table Five sets forth the properties and compositions of various polymer inserts 40 composed of a thermosetting polyurethane. The number of parts of each polyurethane prepolymer for each of the polymer inserts 40 is provided in columns 2 through 6. Column 2 includes the number of parts of the TDI-terminated polyether prepolymer ADIPRENE® LFPX2950. Column 3 includes the number of parts of the PPDI terminated polyether prepolymer, ADIPRENE® LFPX950. Column 4 includes the number of parts of the PPDI terminated polyester (polycaprolactone) prepolymer, ADIPRENE® FPX2950. Column 5 includes the number of parts of the PPDI terminated polyether prepolymer, ADIPRENE® LFPX590. The difference between LFPX590 and LFPX950 is the NCO content and the molecular weight of the polyol (ether) backbone, with LFPX950 having a NCO content in the range of approximately 5.45% to approximately 5.75%, and LFPX590 having a NCO content in the range of approximately 5.6% to approximately 6.2%. Column 6 includes the number of parts of the PPDI terminated polyester (polycaprolactone) prepolymer, ADIPRENE® LFPX2952. The difference between LFPX2950 and LFPX2952 is the NCO content, with LFPX2950 having a NCO content in the range of approximately 3.55% to approximately 3.85%, and LFPX2952 having a NCO content in the range of approximately 4.45% to approximately 5.05%. The insert 60 of example 1 was cured with VIBRACURE 250. Each of the inserts for examples 2–9 and 11–12 were cured with a blend of curing agents. The blend of curing agents was composed of 50 parts ETHACURE 300 (a diamine curing agent) and 50 parts VIBRACURE A250 (a blend of a 1,4 butane diol and glycol). Example 10 of the polymer inserts 60 of the present invention was cured with a blend of 70 parts ETHACURE 300 and 30 parts VIBRACURE A250. The Shore D hardness, based on American Standard Testing Methods, of the polymer insert 40 of present invention may range 42 degrees to 55 degrees.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A putter head comprising:

a club head main body comprising a sole, a crown, a toe section, a heel section, a rear section and a front face having a recess therein;

an insert disposed within the recess, the insert composed of a polymer material, the insert having a Shore D hardness in the range of 42 to 55, and a Bayshore rebound in the range of 55 to 70;

an isolation layer having a first surface and a second surface, the isolation layer composed of a polymer material; and a weight body attached to the first surface of the isolation layer, the weight body composed of a tungsten alloy.

* * * * *